United States Patent [19]
Brown et al.

[11] Patent Number: 5,559,713
[45] Date of Patent: Sep. 24, 1996

[54] CHIP BUILDUP DETECTION AND CONTROL METHOD AND APPARATUS

[75] Inventors: Jeffrey Brown; Dennis G. Rochon, both of Windsor, Canada

[73] Assignee: Western Atlas, Inc., Hebron, Ky.

[21] Appl. No.: 343,652

[22] Filed: Nov. 22, 1994

[51] Int. Cl.$^6$ .................................................. B23B 51/06
[52] U.S. Cl. ............................ 364/474.16; 364/474.19; 408/1 R; 408/59
[58] Field of Search ..................... 364/474.16, 474.17, 364/474.19, 551.02; 239/112, 113; 407/11; 408/1 R, 3, 17, 10–13, 56–61; 409/137, 135, 136, 249; 184/6.4, 6.14

[56] References Cited

U.S. PATENT DOCUMENTS

| 4,529,340 | 7/1985 | O'Dell | 408/1 R |
| 5,028,176 | 7/1991 | Delventhal et al. | 408/59 |
| 5,152,641 | 10/1992 | Overmyer et al. | 408/1 R |

Primary Examiner—Roy N. Envall, Jr.
Assistant Examiner—Steven R. Garland
Attorney, Agent, or Firm—Barnes, Kisselle, Raisch, Choate, Whittemore & Hulbert

[57] ABSTRACT

A chip buildup detection and control apparatus having a flow transducer and flow monitor to measure and monitor coolant flow to a cutter of a machine tool for detecting excessive chip buildup on the cutter and removing the buildup on the cutter which decreases machining cycle time while increasing cutter life and machine tool production. Excessive chip buildup on the cutter is detected when coolant flow to the cutter drops below a minimum flow rate limit. Buildup is removed upon detection by initiating a "pecking" cycle where the cutter is retracted from its position of engagement with the workpiece being machined for a predetermined dwell period of time. The machining cycle is aborted if coolant flow does not rise above the minimum limit by the end of the dwell period. If coolant flow rises above the minimum flow limit, the cutter is advanced almost to its previous position of engagement with the workpiece and machining is resumed. Preferably, if coolant flow to the cutter rises above a maximum flow rate limit, the "pecking" cycle is initiated and, thereafter, the machining cycle is aborted if flow does not drop below the maximum limit during a predetermined dwell period. In a preferred embodiment, a "pecking" cycle is initiated if coolant flow to the cutter falls outside a normal flow rate window of between the minimum and maximum flow rate limits. Therefore, "pecking" cycles are only initiated when excessive chip buildup or cutter failure is detected.

23 Claims, 2 Drawing Sheets

CHIP BUILDUP DETECTION AND CONTROL METHOD AND APPARATUS

FIELD OF THE INVENTION

This invention relates to a method and apparatus for detecting and controlling chip buildup on a cutter of a machine tool.

BACKGROUND

During machining of a workpiece by a cutter of a machine tool, chips of workpiece material can buildup on the cutter and within the workpiece reducing the efficiency of machining and increasing the load on the cutter. By increasing the load on the cutter, it can become fatigued and fail earlier than anticipated increasing machining costs and reducing the production rate of workpieces machined by the machine tool. Additionally, in some instances, if chip buildup is not timely removed it can affect machining quality resulting in an increase in the number of machined workpieces that are rejected during quality control inspection.

For example, in deep hole machining, a gun boring cutter used to bore a deep hole or a reaming tool used to finish a hole must be periodically retracted away from the workpiece during machining to release chips that have built up on the cutter and/or in the hole and cause them to be removed from the cutter. Additionally, for cutting tools that have high pressure coolant flowing through the cutter, retracting the cutter from the hole enables the high pressure coolant to flush chips from the cutter and clear them from the hole.

This chip removal cycle is commonly known as a "pecking" cycle. During a "pecking" cycle, the cutter is periodically retracted from the hole to remove chip buildup from the cutter and chips that have accumulated in the hole, typically, after the cutter has been fed into the workpiece a predetermined time or fixed distance during machining the workpiece. Depending upon the workpiece, its material of construction and the depth of the hole being bored, the machine tool may perform a "pecking" cycle after each couple of inches bored by the cutter. Thus, in deep hole drilling, "pecking" cycles typically occur several times during the machining of each workpiece significantly increasing the machining cycle time of each workpiece while reducing the rate of production of finished workpieces.

SUMMARY OF THE INVENTION

A chip buildup detection and control apparatus for detecting chip buildup on a cutter of a machine tool and removing buildup from the cutter to increase cutter life while decreasing machining cycle time. The chip buildup detection and control apparatus has a flow transducer and flow monitor for measuring and monitoring coolant flow to the cutter. If coolant flow to the cutter drops below a minimum acceptable flow rate limit, indicating excessive chip buildup on the cutter and/or within the hole being machined by the cutter, a "pecking" cycle is initiated. During the "pecking" cycle, the cutter is retracted from its position of engagement with the workpiece for a predetermined dwell period of time to remove chip buildup from the cutter and, if necessary, within the workpiece. During retraction and while the cutter is retracted, coolant flow to the cutter facilitates chip removal by flushing chips free of the cutter and workpiece.

If coolant flow does not rise above the minimum flow limit by the end of the dwell period, the machining cycle, preferably, is aborted and the cutter is retracted free of the workpiece for inspection and, if necessary, replacement. However, if coolant flow does rise to a normal flow rate above the minimum limit, the cutter is, preferably, rapidly advanced relative to the workpiece almost to its previous position of engagement with the workpiece so that it can be further advanced at its normal feed rate into the workpiece to continue machining it.

Preferably, the "pecking" cycle is also initiated if coolant flow to the cutter rises to a flow rate that is greater than a maximum acceptable flow rate limit which indicates that the cutter is broken or defective. If coolant flow does not drop below the maximum limit by the end of the predetermined dwell period, the machining cycle is aborted and the cutter is retracted free of the workpiece for inspection and, if necessary, replacement.

Therefore, a "pecking" cycle is preferably only initiated if coolant flow to the cutter rises to a flow rate that is greater than the maximum flow limit or drops to a flow rate that is less than the minimum flow limit. Normal machine tool operation continues uninterrupted as long as coolant flow to the cutter remains within a normal window of flow rates between the minimum and maximum acceptable flow limits.

Objects, features and advantages of this invention are to provide a chip buildup detection and control apparatus and method for monitoring coolant flow to the cutter of a cutting tool for detecting and removing excessive chip buildup which increases the production rate of workpieces machined by the machine tool because "pecking" cycles are initiated only when needed to remove chip buildup on the cutter, reduces machining cycle time because "pecking" cycles are initiated only when needed and not at fixed periods during machining each workpiece, increases the life of the cutter by removing excessive chip buildup from the cutter to prevent the buildup from overloading and undesirably fatiguing or breaking the cutter, detects when excessive chip buildup on the cutter cannot be removed so the cutter can be inspected and cleaned or replaced, and detects cutter failure so the cutter can be quickly inspected and, if necessary, replaced, and, is reliable, flexible, durable and of simple and compact design, rugged construction, and economical manufacture.

BRIEF DESCRIPTION OF THE DRAWINGS

These and other objects, features and advantages of this invention will be apparent from the following detailed description, appended claims and accompanying drawings in which:

DETAILED DESCRIPTION OF THE INVENTION

Figure 1:
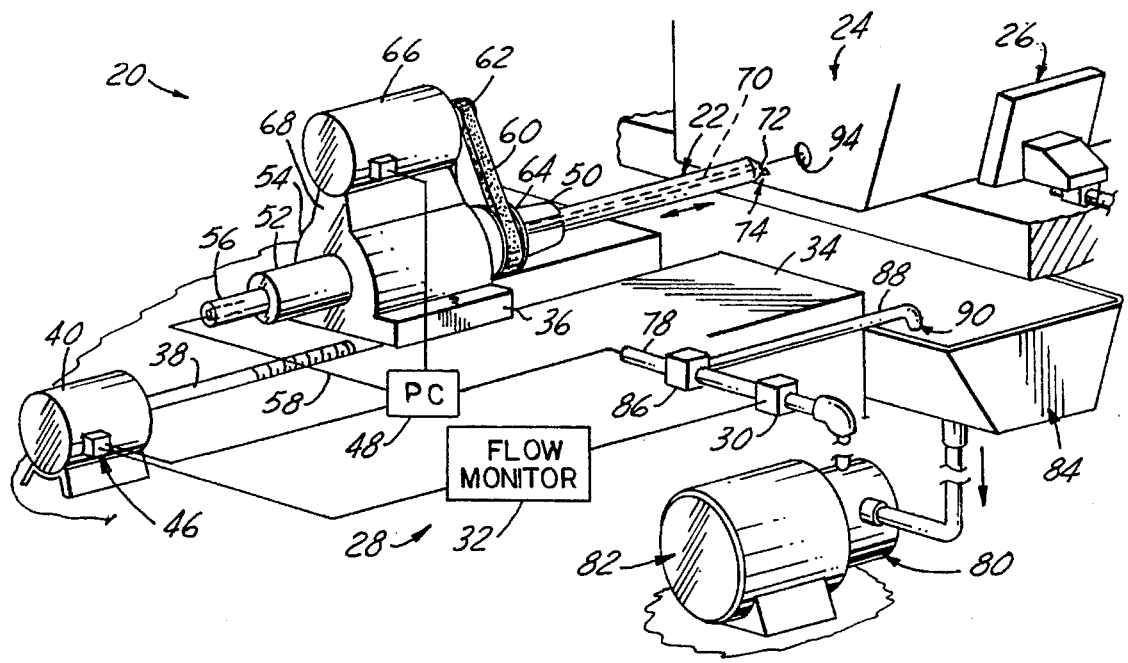
FIG. 1 is a perspective view of a cutting tool having a gun drilling cutter and a chip buildup detection and control apparatus of this invention.
Figure 2:
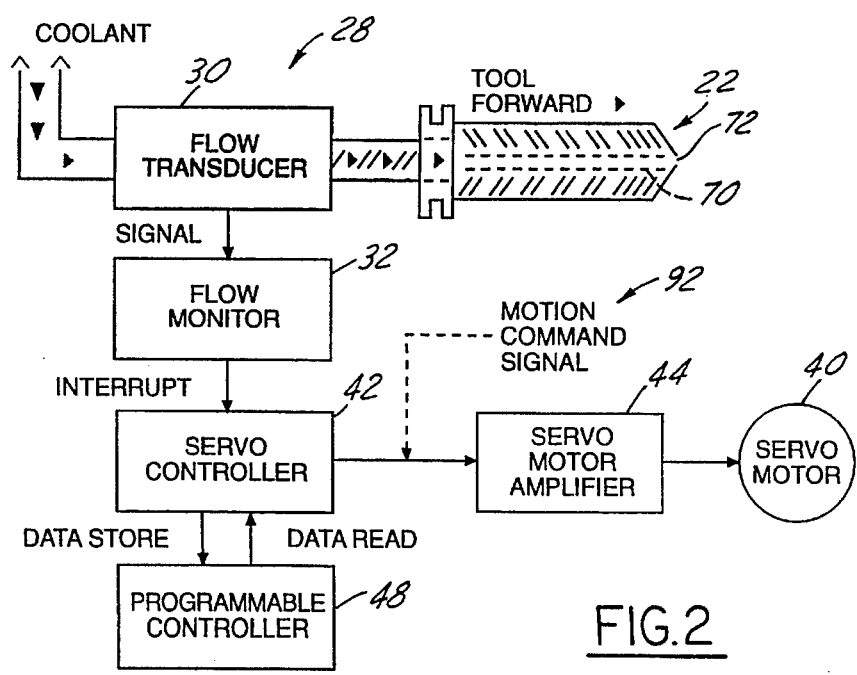
FIG. 2 is a schematic of the chip buildup detection and control apparatus.

FIGS. 1 & 2 illustrate a machine tool 20 having a cutting tool or drill 22 for machining a deep hole in a workpiece 24 that is located and clamped in a fixture 26. A chip buildup detection and control apparatus 28 of this invention detects excessive chip buildup on the cutter 22 during machining and initiates a "pecking" cycle to retract the cutter 22 away from the workpiece for clearing the cutter 22 and/or workpiece 24 of buildup of chips of workpiece material.

To detect excessive chip buildup, the chip buildup detection and control apparatus 28 has a transducer 30 for sensing and thereby providing measurement of coolant flow to the cutting tool 22 and a flow monitor 32 that communicates with the transducer 30 to monitor coolant flow during machine tool operation. Excessive chip buildup is detected by the monitor 32 when the transducer 30 indicates coolant flow to the cutter 22 is below a minimum acceptable flow rate limit. Since the "pecking" cycle is only initiated when excessive chip buildup is detected by the flow monitor 32, premature cutter failure is prevented and the time required to machine each workpiece is reduced, boosting the production rate of workpieces machined by the tool 20.

Preferably, the chip control apparatus 28 also monitors coolant flow to determine when the cutter 22 is defective, such as if it is broken, so it can be retracted from the workpiece 24 and replaced. Preferably, a defective cutter is detected by the monitor 32 when the transducer 30 indicates coolant flow to the cutter is above a maximum acceptable flow rate limit. Preferably, a "pecking" cycle is initiated should coolant flow to the cutter 22 fall outside a normal window of flow rates between the minimum and maximum acceptable flow rate limits.

As is shown in FIG. 1, the machine tool 20 has a base 34 on which a slide 36 is mounted for reciprocation toward and away from the workpiece 24. The slide 36 is moved by a ball screw and nut assembly 38 driven by a servomotor 40 carried by the base 34. To precisely control direction and displacement of the cutter 22 relative to the workpiece 24, a servomotor controller 42 and servomotor amplifier 44, represented in FIG. 1 by a housing 46 on the servomotor 40, is responsive to signals from a control computer 48, such as a programmable controller, and the flow monitor 32 for controlling operation of the servomotor 40.

The cutter 22 is received in a chuck 50 fixed to a spindle 52 journalled for rotation in a housing 54 mounted on the slide 36. The spindle 52 is driven through a timing belt 60 and cog pulleys 62 & 64 by an electric motor 66 mounted on a platform 68 secured to the spindle 54. At its other end, the spindle 52 has a rotary union 56 with a fluid coupling connected to a flexible coolant hose 58 that enables coolant to be supplied to the cutter 22 during machine tool operation.

The cutter 22 has a central passage 70, shown in phantom, that is in fluid flow communication with the flexible hose 58 and an orifice 72 at its free end for supplying a cutting surface 74, such as a replaceable cutting insert, of the cutter 22 with coolant for lubricating and cooling the cutting surface 74 during machining and flushing chips away from the cutting surface 74. As is shown in FIG. 1, the cutter 22 may be a gun boring cutting tool 76 with a cutting insert 74 at its free end adjacent the coolant orifice 72 for machining deep holes in workpieces. However the cutter 22 could also be a reaming tool or another type of cutter that utilizes a "pecking" cycle to remove chip buildup during machining.

Although a single machine tool 20 is shown in FIG. 1, two or more tools of like construction could be used to simultaneously machine one or more workpieces. For example, two boring tools could be positioned side by side: for machining a pair of holes in a single workpiece, such as is disclosed in U.S. Pat. No. 5,221,165, the disclosure of which is incorporated herein by reference.

To supply coolant to the cutter 22, the coolant hose 58 is connected to a conduit 78 leading to a pump 80 that is driven by a motor 82 and which draws coolant from a reservoir 84 for delivering the coolant through the coolant conduit 78 and hose 58 to the cutter orifice 72. Preferably, the pump 80 runs continuously, even if high pressure coolant is not being supplied to the cutter 22, to prevent undesirable pump and motor wear and possible premature failure associated with cycling the motor 82 and pump 80 to provide high pressure coolant to the cutter 22 only when needed. Preferably, the pump 80 delivers coolant at relatively high pressures, about 1000 pounds per square inch (PSI), at least 200 PSI, and, typically, several hundred PSI.

To enable the pump 80 to run continuously when coolant is not being supplied to the cutter 22 and enable coolant to be provided to the cutter 22 only when needed, a dump valve 86 in the coolant conduit 78 downstream of the pump 80 and upstream of the cutter 22 diverts coolant flow from the cutter 22 to the coolant reservoir 84 when the cutter 22 does not need coolant from the pump 80. The dump valve 86 preferably is in communication with the programmable controller 48 for diverting high pressure coolant flow in response to a signal from the controller 48. For example, the programmable controller 48 could cause the dump valve 86 to divert coolant flow from the pump 80 to the reservoir 84 after each workpiece 24 is machined and until another workpiece 24 has been fixtured for machining.

The dump valve B6 has a conduit 88 extending to the reservoir 84 with an orifice 90 at its free end for providing resistance to flow from the pump 80 about equal to the flow resistance the pump 80 encounters when delivering coolant to the cutter 22. Preferably, the flow resisting orifice 90 is adjustable, such as by using a hand tool, for quickly and easily adjusting its resistance to coolant flow, when diverted to the reservoir 84, until it substantially matches the flow resistance of the cutter 22.

Since the orifice 90 provides a flow resistance about equal to that of the cutter 22, transients in coolant flow through the conduit 78, other than those caused by chip buildup and cutter failure, are virtually eliminated when the dump valve 86 is switched back and forth to divert coolant flow to and away from the cutter 22. By virtually eliminating these flow transients, the flow transducer 30, upstream of the dump valve 86, thereby is prevented from providing an erroneous coolant flow reading to the monitor 32. Additionally, the flow resisting orifice 90 advantageously enables coolant flow to be diverted from the cutter 22 to the reservoir 84 without the pump 80 experiencing hammer due to large transients or surges in flow because, under normal operating conditions, the orifice 90 assures that coolant flow from the pump 80 will remain relatively the same, whether it is being supplied to the cutter 22 or dumped into the reservoir 84.

The flow transducer 30 is located downstream of the pump 80 and upstream of the dump valve 86 so that it does not provide a flow rate signal to the monitor 32 indicative of coolant flow being below the minimum acceptable coolant flow limit while coolant is being diverted to the reservoir 84. Providing the constant flow orifice 90 with substantially the same resistance to flow as the cutter 22 prevents any significant transients in coolant flow which might occur upon diverting flow from the reservoir 84 back to the cutter 22 that could cause coolant flow to fall outside the window of normal flow rates possibly causing the flow monitor 32 to erroneously conclude that there is excessive chip buildup on the cutter 22 or a defective cutter.

During operation of the machine tool 20, a series of the workpieces 24 is advanced into and out of the tool 20 by a suitable transfer mechanism, such as for example, a lift and carry transfer (not shown). Typically, the cutter 22 is rapidly advanced toward the workpiece 24 and then more slowly fed into the workpiece 24 at an appropriate or normal rate of feed to machine the workpiece 24. After the cutter 22 has reached its full depth of cut position in the workpiece 24, the cutter 22 is, preferably, rapidly retracted from of the workpiece 24 and then the workpiece 24 is unclamped from the fixture 26 and transferred from the machine tool 20. Preferably, thereafter, another workpiece 24 is transferred into the fixture 26 and located and clamped for machining.

During the machining of each workpiece 24, the chip control apparatus 28 monitors coolant flow to the cutter 22. Should coolant flow to the cutter 22 fall below the minimum acceptable coolant flow limit, a "pecking" cycle is initiated and the cutter 22 is retracted from its position of engagement with the workpiece 24 for a predetermined dwell period of time to clear the cutter 22 of excessive chip buildup and, if necessary, also remove chips that have accumulated in the hole 94 of the workpiece 24. If coolant flow rises above the minimum limit during the dwell period indicating that excessive chip buildup has been removed, the "pecking" cycle is concluded by returning the cutter 22 almost to its position of engagement with the workpiece 24 and then feeding the cutter 22 at its normal feed rate further into the workpiece 24 to resume machining it. However, if coolant flow has not risen above the minimum flow limit by the time the predetermined dwell period has elapsed, the machining cycle is completely aborted and the cutter 22 is completely retracted from the workpiece 24 so the cutter 22 can be inspected and manually cleaned of chip buildup or, if necessary, replaced.

Preferably, the minimum acceptable flow rate limit is a coolant flow rate equal to or above which it has been established there is excessive chip buildup on the cutter 22 and/or in the hole 94 of the workpiece 24. The minimum flow limit can be empirically determined by monitoring coolant flow to the cutter 22 to determine the flow rate at which chip buildup undesirably increases the load on the cutter 22 or significantly detrimentally affects performance of the cutter 22 during machining. Preferably, the minimum flow limit can be a flow rate above that which can cause cutter breakage or other cutter failure due to excessive chip buildup.

Preferably, if coolant flow to the cutter 22 rises above the maximum acceptable coolant flow rate limit indicating that the cutter 22 is defective or broken, a "pecking" cycle is initiated and the cutter 22 is also retracted away from the workpiece 24 for a predetermined dwell period. The machining cycle will be aborted if coolant flow has not dropped below the maximum acceptable flow limit during the dwell period so that the cutter 22 can be retracted completely from the workpiece 24, inspected, and, if necessary, replaced. Alternatively, if it is determined that coolant flow to the cutter 22 is greater than the maximum acceptable flow limit only when the cutter 22 breaks or becomes defective, the machining cycle can be aborted immediately upon detecting the excessively high coolant flow so that, as quickly as possible, the cutter 22 can be removed from and retracted completely free of the workpiece 24 and replaced.

Preferably, the maximum acceptable flow rate limit is a coolant flow rate equal to or above that which has been established that the cutter 22 is broken. The maximum flow limit can be empirically determined by monitoring coolant flow to the cutter to record the coolant flow rate to the cutter 22 while it is being fed into the workpiece during machining and after it is known to be broken. Preferably, the maximum acceptable coolant flow limit is a flow rate just above the point of cutting tool breakage that has been empirically determined for the cutter 22.

Preferably, for a given cutter 22, to determine the minimum and maximum acceptable coolant flow limits, the coolant flow rate to the cutter 22 is empirically determined when (a) coolant is freely flowing through the cutter 22 when the cutter 22 is removed from and completely free of the workpiece, (b) while the cutter 22 is machining the workpiece 24 under normal conditions and without excessive chip buildup, and (c) while the cutter 22 is machining the workpiece 24 and experiencing excessive chip buildup even to the point where it causes the cutter 22 to break. Preferably, the minimum flow rate limit is set at a flow rate above the flow rate determined in (c), that is, the flow rate while the cutter 22 is machining the workpiece 24 and experiencing excessive chip buildup. Preferably, to detect cutter failure, the maximum flow rate limit is set at or slightly above the free flow rate determined in (a).

Additionally, since flow rate to the cutter 22 varies somewhat from one cutter to the next, for cutters producing the same size hole in a workpiece, some empirical testing or calibration may be required for each cutter to determine its free flow rate and flow rate during normal machining without excessive chip buildup. This data would then be used to adjust the minimum and maximum acceptable coolant flow rate limits used to detect excessive chip buildup and cutter failure.

Preferably, the chip control apparatus 28 begins monitoring coolant at the beginning of the machining cycle, even before the cutter 22 engages the workpiece 24. If coolant flow remains within the normal flow rate window of between the minimum and maximum acceptable coolant flow rate limits during machining, machine tool operation continues uninterrupted by any "pecking" cycle. Therefore, "pecking" cycles are only initiated when coolant flow conditions indicate they are needed thereby increasing machining production rates. In other words, should coolant flow to the cutter 22 remain within the normal flow rate window, one or more, or even several, workpieces can be machined without a single "pecking" cycle ever occurring.

As is shown more clearly in FIG. 2, the servomotor amplifier 44 energizes the servomotor 40 and causes it to rotate in the direction desired in response to signals from the servomotor controller 42 or from a motion command signal 92 such as given by an operator of the machine tool 20. The servomotor controller 42 controls operation of the servomotor 40, as well as the direction of travel and displacement of the cutter 22, in response to signals received from the programmable controller 48 and flow monitor 32. Preferably, the servomotor controller 42 can also provide the position of the cutter 22 relative to the workpiece 24 during machine tool operation.

Preferably, during tool operation, the cutter drive motor 66 is energized by the programmable controller 48 at the beginning of each machining cycle and shut off upon being retracted from the workpiece 24 after the cutter 22 reaches the full depth of cut position of engagement with the workpiece 24, indicating that the workpiece 24 has been completely machined. Preferably, the precise position of the cutter 22 clan be communicated to the programmable controller 48 by the servomotor controller 42 for determining when the cutter 22 has reached the full depth of cut position. Since, the full depth of cut position is dependent upon how far into the workpiece 24 the cutter 22 must bore to provide a hole 94 in the workpiece 24 of proper depth, the full depth of cut position may be calculated or determined empirically and stored in the programmable controller computer 48 for comparison with the actual position of the cutter 22 during actual machining.

As is shown schematically in FIG. 2, the flow transducer 30 and coolant flow monitor 32 are linked together so that the monitor 32 can, preferably, continuously communicate with the transducer 30 to continuously determine real time coolant flow to the cutter 22. Preferably, the monitor 32 and flow transducer 30 have enhanced sensitivity and/or selectivity in the coolant flow range extending from slightly below the minimum acceptable flow rate limit to slightly above the maximum acceptable flow rate limit for more accurately and quickly monitoring and detecting chip buildup on the cutter 22 and cutter failure.

Preferably, the flow transducer 30 and monitor 32 is a unitary assembly marketed by Universal Flow Monitors, Inc., of Hazel Park, Mich., as a GDN HIGH PRESSURE COOLANT MONITOR. Such a GDN HIGH PRESSURE COOLANT MONITOR is also available in a piping block or manifold arrangement for distributing coolant from the pump 80 to multiple cutting tools 22 while measuring and monitoring coolant flow to each cutting tool 22 to independently initiate "pecking" cycles for any of the cutters 22 as excessive chip buildup is detected.

If a chip control apparatus 28 is used to monitor coolant flow to multiple cutting tools, the coolant conduit 78 in communication with each cutter 22 preferably has a dump valve 86, transducer 30 and flow monitor 32. Preferably, operation is sequenced so the cutting tools 22 all receive high pressure coolant flow from the pump 80 at the same time and, for all of the cutting tools, high pressure coolant is dumped to the reservoir 84 at the same time, such as after the machining cycles are completed for all of the tools 22, to minimize flow transients through each flow transducer 30 during machining.

For each cutting tool 22, while the dump valve 86 is directing coolant to the cutter 22, the flow monitor 32 signals the servomotor controller 42 if the rate of coolant flow to the cutter 22 drops below the minimum acceptable flow limit or if the flow rate rises above the maximum limit. Preferably, if coolant flow to the cutter 22 falls out of this normal flow window of between the two limits, the flow monitor 32 directly signals the servomotor controller 42 to cause it to immediately start the "pecking" cycle.

When the servomotor controller 42 receives the signal from the flow monitor 32, such as in the form of a computer interrupt signal indicated in FIG. 2, it begins the "pecking" cycle by immediately reversing direction of the servomotor 40 causing it to retract the cutter 22 a predetermined fixed distance away from its position of engagement with the workpiece 24 to enable the cutter 22 to free itself of chip buildup while permitting coolant flowing through the cutter 22 to also remove and flush away buildup. Preferably, at the beginning of the "pecking" cycle, the servomotor controller 42 communicates to the programmable controller 48 the previous position of the cutter 22, that is, its position of engagement with the workpiece 24 just before being retracted, so that it can be stored for later recall and use.

Preferably, after being retracted from its position of engagement with the workpiece 24, the cutter 22 dwells in the retracted position for a predetermined fixed period of time to allow coolant flowing through the cutter 22 to flush away chip buildup from the cutter 22. This reduces excessive load on the cutter 22 during machining which extends its life and enables it to machine more efficiently. Should high pressure coolant flow to the cutter 22 return to within the normal flow rate window during this dwell period, indicating that excessive chip buildup has been removed, the signal from the flow monitor 32 ceases, the stored position of previous engagement with the workpiece 24 is read and a new position is calculated using the stored position as a reference. Preferably, the new calculated cutter position is not as deep as or is short of the recalled previous position of engagement with the workpiece 24 by a predetermined offset.

Preferably, the new cutter position is not as deep within the workpiece 24 as the previous position of engagement so that the cutter 22 can be rapidly advanced almost to the previous position of engagement before resuming its normal feed rate for machining the workpiece 24. Thereafter, at the conclusion of the "pecking" cycle, the programmable controller 48 communicates with the servomotor controller 42 to once again begin feeding the cutter 22 into the workpiece 24 at its normal machining feed rate to resume machining it.

However, if coolant flow to the cutter 22 does not return to within the normal flow rate window during the dwell period, the machining cycle is aborted and the cutter 22 is removed from and retracted completely free of the workpiece 24. Preferably, the workpiece 24 is inspected by an operator of the machine tool 20 and cleaned or replaced, if defective or broken. Should, however, the machine tool 20 have an automatic tool changer, the cutter 22 may automatically be changed by the tool changer if the machining cycle is aborted.

Figure 3:
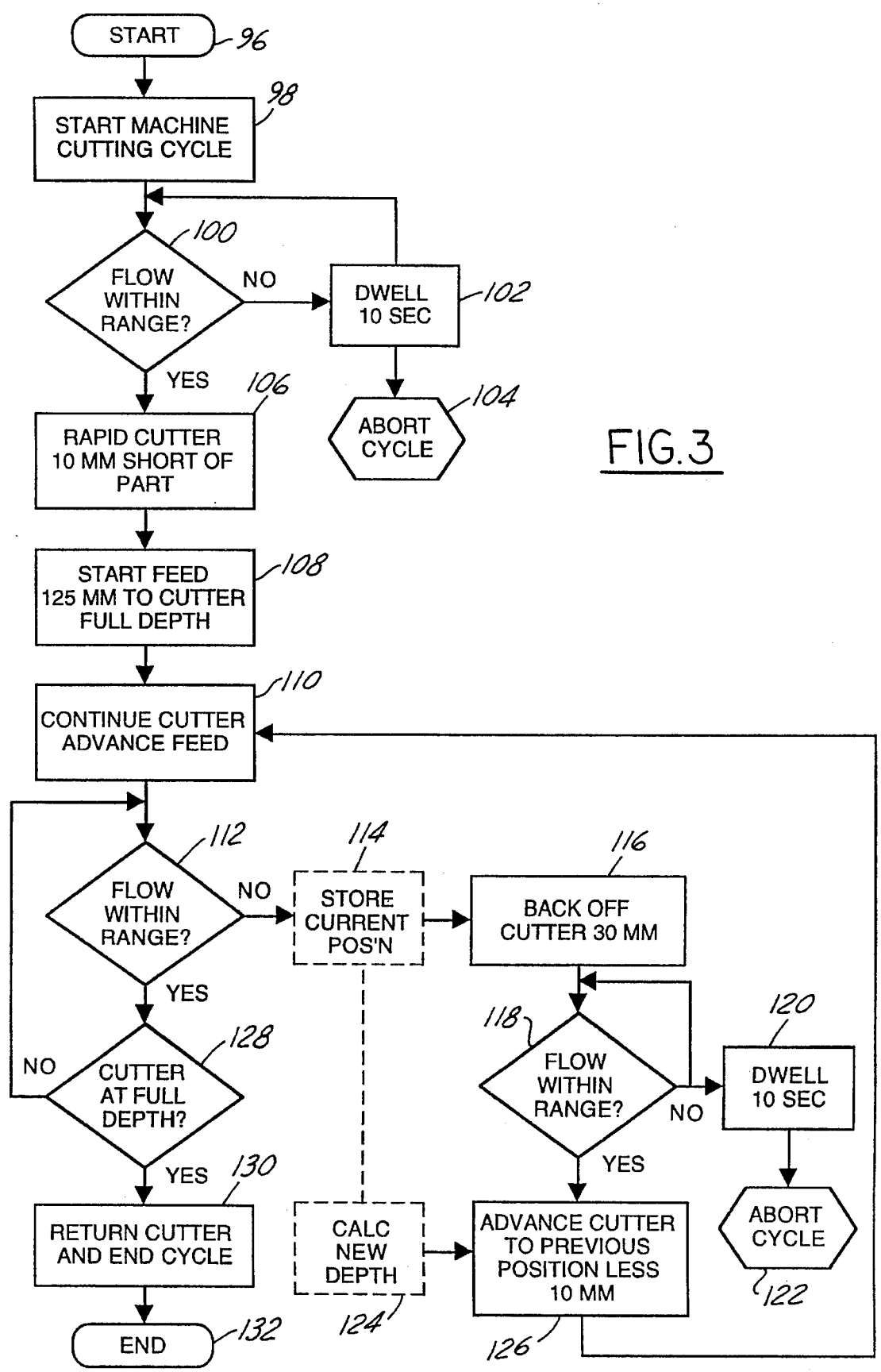
FIG. 3 is a schematic depicting operation of the chip buildup detection and control apparatus.

FIG. 3 illustrates operation of a preferred embodiment of a chip buildup detection and control apparatus 28 of this invention having, for example, a minimum acceptable coolant flow rate limit of 7.3 gallons per minute, a maximum acceptable coolant flow rate limit of 8 gallons per minute and, therefore, a normal operative coolant flow rate window or range of between 7.4 and 7.9 gallons per minute (GPM). In operation, at the start 96 of operation of the machine tool 20, the machining cycle is preferably begun by introducing coolant to the cutter 22.

Upon the start 98 of the machining cycle, the flow monitor 32 communicates with the flow transducer 30 to determine whether coolant flow to the cutter 22 is within the normal flow window 100 of between 7.4 and 7.9 GPM. If coolant flow to the cutter 22 is outside the normal coolant flow range, the machining cycle is suspended for a predetermined dwell period 102 of about ten seconds. If coolant flow to the cutter 22 does not return to within the normal flow range by the end of the dwell period 102, the machining cycle is aborted 104 and, preferably, an operator of the machine tool 20 is notified of the faulty flow condition so the cutter 22 can be inspected and, if necessary, replaced.

If coolant flow is normal, or returns to within the normal flow window or range during the dwell period 102, the programmable controller 48 communicates with the servo controller 42 so that the servomotor 40 rapidly advances 106 the cutter 22 to a predetermined position that is about ten millimeters away from the part 24 to be machined. Preferably, before the start of machining 108, the programmable controller 48 energizes the cutter drive motor 66 to rotate the cutter 22 and the servomotor 40 advances the cutter 22 controllably toward the workpiece 24 at its normal rate for feeding 108 the cutter 22 into the workpiece 24 to machine it.

As the cutter 22 is fed 110 into the workpiece 24, the flow monitor 32 monitors coolant flow to the cutter 22 to determine if there is excessive chip buildup. If coolant flow is not within the normal coolant flow range 112, a "pecking" cycle is initiated by storing the position of clatter engagement 114 with the workpiece 24 at the time faulty coolant flow is detected and immediately backing off 116 the cutter 22 about thirty millimeters from the stored cutter position to allow excessive chip buildup to be removed by coolant flow. Coolant flow is further monitored 118 during a predetermined ten second dwell period 120 after the cutter 22 has been retracted to determine if excessive chip buildup has been removed and coolant flow has returned to within the normal coolant flow range. If coolant flow does not return to within the normal coolant flow range by the end of the dwell period 120, the machining cycle is aborted 122 and the cutter 22 is removed from and retracted completely free of the workpiece 24.

However, if normal coolant flow to the cutter 22 resumes while the cutter 22 is in its retracted position, a new cutter depth is calculated 124 using the stored previous cutter engagement position 114 as a reference. As is shown in FIG. 3, a new cutter depth of about ten millimeters less than the previous position of engagement with the workpiece is calculated and the cutter 22 is, preferably, rapidly advanced 126 from its retracted position further into the workpiece 24 to the calculated depth 124.

After advancing the cutter 22 to the calculated position 124, the cutter 22 is once again fed 110 at its normal rate into the workpiece 24 to continue machining it. During feeding the cutter 22 into the workpiece 24, coolant flow is, preferably, continually monitored to determine whether it is within the normal coolant flow range 112. If flow is within range 112, the position of the cutter 22 relative to the workpiece 24 is read to determine if the cutter 22 has reached the full depth of cut position 128 indicating that machining of the workpiece 24 is completed. If the cutter 22 reaches the full depth of cut position 128, the cutter 22 is completely retracted from the workpiece 24 and returned 130 to its position at the start of the machining cycle 98, ending the machining cycle 132.

Preferably, upon successful completion of the machining cycle 132, the machined workpiece 24 is unclamped from the fixture 26 and transferred from the machine tool 20. Thereafter, preferably, another workpiece is located and clamped in the fixture 26 for machining and the machining cycle is started 98 again.

While the present invention has been disclosed in connection with the preferred embodiments thereof, it should be understood that there will be other embodiments which fall within the spirit and scope of the invention and that the invention is susceptible to modification, variation and change without departing from the scope and fair meaning of the following claims.

What is claimed is:

1. An apparatus for detecting chip buildup on a cutter of a machine tool that is movable relative to a workpiece comprising:

a supply for providing coolant to the cutter;

a drive for relatively moving the cutter toward and away from the workpiece;

a transducer for sensing coolant flow to the cutter; and a monitor in communication with said transducer for monitoring said coolant flow to the cuter and causing the drive to move the cutter relatively away from the workpiece if said coolant flow is less than a minimum acceptable coolant flow rate limit indicating chip buildup on the cutter for enabling chip buildup to be removed from the cutter.

2. The apparatus of claim 1 wherein said minimum acceptable flow rate limit is a rate of flow of coolant to the cutter which is less than the flow rate at which it is known that there is chip buildup on the cutter.

3. The apparatus of claim 2 wherein said minimum acceptable flow rate limit is a rate of flow of coolant to the cutter which is greater than the flow rate at which it is known that chip buildup will cause breakage of the cutter.

4. The apparatus of claim 1 wherein said flow monitor generates a signal when said coolant flow is less than said minimum acceptable coolant flow rate limit and also comprising:

a programmable controller for controlling operation of the cutter; and a drive controller in communication with said drive for controlling the direction that said drive moves the cutter and in communication with said programmable controller for causing said drive to move the cutter toward the workpiece to begin machining the workpiece, feed the cutter into the workpiece to machine the workpiece, and retract the cutter from the workpiece when machining the workpiece is finished, and said drive controller being responsive to signal generated by said flow monitor for moving the cutter away from the workpiece to remove chip buildup from the cutter when said monitor generates said signal indicating said coolant flow is less than said minimum acceptable coolant flow rate limit.

5. The apparatus of claim 1 wherein the cutter is a deep hole boring tool.

6. An apparatus for detecting chip buildup on a cutter of a machine tool that is movable realtive to a workpiece comprising:

a supply for providing coolant to the cutter;

a transducer for sensing coolant flow to the cutter;

a monitor in communication with said transducer for monitoring said coolant flow to the cutter and moving the cutter relatively away from the workpiece if said coolant flow is less than a minimum acceptable coolant flow rate limit indicating chip buildup on the cutter for enabling chip buildup to be removed from the cutter, and said flow monitor also relatively moves the cutter away from the workpiece if said coolant flow is greater than a maximum acceptable coolant flow rate limit above which it is known that the cutter is defective.

7. The apparatus of claim 6 wherein said maximum acceptable flow limit is greater than the rate of flow of coolant to the cutter when the cutter is free of the workpiece and not machining any workpiece.

8. The apparatus of claim 6 wherein said transducer and said monitor have expanded sensitivity and selectivity in the range of coolant flow from slightly less than said minimum acceptable flow rate limit to slightly greater than said maximum acceptable flow rate limit for more accurately and quickly determining whether coolant flow to the cutter is within said minimum and maximum flow rate limits.

9. An apparatus for detecting chip buildup on a cutter of a machine tool that is movable realtive to a workpiece comprising:

a supply for providing coolant to the cutter;

a transducer for sensing coolant flow to the cutter;

a monitor in communication with said transducer for monitoring said coolant flow to the cutter and moving the cutter relatively away from the workpiece if said coolant flow is less than a minimum acceptable coolant flow rate limit indicating chip buildup on the cutter for enablin chip buildup to be removed from the cutter, and, said coolant supply comprises a reservoir for holding coolant, a conduit in fluid flow communication with said reservoir and the cutter for enabling coolant to flow from said reservoir to the cutter, a pump in fluid flow communication with said conduit for receiving coolant from said reservoir and, delivering it under pressure through said conduit to the cutter, a valve downstream of said pump and upstream of the cutter for diverting coolant into said reservoir when the cutter does not require coolant and enabling coolant to flow to the cutter when the cutter requires coolant, and wherein said flow transducer is downstream of said pump and upstream of said valve for sending coolant flow in said conduit.

10. The apparatus of claim 9 wherein said pump delivers coolant at a pressure of at least 200 pounds per square inch.

11. The apparatus of claim 9 wherein said pump delivers coolant at a pressure of at least 500 pounds per square inch.

12. The apparatus of claim 9 also comprising an orifice downstream of said valve for providing substantially the same resistance to coolant flow as the cutter for minimizing flow transients in said conduit at said flow transducer thereby maintaining relatively the same flow through said transducer when said valve is diverting coolant from said pump into said coolant reservoir and when said valve is permitting coolant to flow to the cutter.

13. The apparatus of claim 12 wherein said orifice is adjustable to adjust its resistance to coolant flow for providing substantially the same resistance to flow as the cutter to maintain relatively the same flow through said transducer when said valve is diverting coolant from said pump into said coolant reservoir and from said pump to the cutter.

14. A method of detecting chip buildup on a cutter of a machine tool that is movable relative to a workpiece and having a coolant passage and orifice for enabling coolant to be provided to the cutter comprising:

(a) providing a drive for moving the cutter relative to the workpiece, a coolant supply for supplying coolant to the cutter, a transducer for sensing coolant flow to the cutter, and a monitor in communication with the drive and flow transducer for monitoring coolant flow and relatively moving the cutter away from the workpiece if coolant flow to the cutter is equal to or less than an acceptable minimum flow rate limit;

(b) supplying coolant to the coolant passage and orifice of the cutter;

(c) advancing the cutter toward the workpiece;

(d) feeding the cutter into the workpiece to machine the workpiece;

(e) monitoring coolant flow to the cutter while it is being fed into the workpiece during step (d) to determine if coolant flow to the cutter is equal to or less than the acceptable minimum flow limit;

(f) relatively moving the cutter away from its position of engagement with the workpiece if coolant flow to the cutter is equal to or less than the acceptable minimum flow limit;

(g) monitoring coolant flow after step (f) to determine if coolant flow is equal to or less than the acceptable minimum flow rate limit;

(h) repeating steps (d), (e), (f) and (g) if during step (g) coolant flow becomes greater than the acceptable minimum flow rate limit, otherwise removing and retracting the cutter completely free of the workpiece; and (i) retracting the cutter free of the workpiece if the cutter has finished machining the workpiece.

15. The method of claim 14 wherein the cutter is retracted free of the workpiece in step (i) if the cutter has reached a full depth of cut position relative to the workpiece indicating that the cutter has completely machined the workpiece.

16. The method of claim 14 wherein during step (c) the cutter is rapidly advanced toward the workpiece until the cutter is adjacent the workpiece before the cutter is fed into the workpiece in step (d).

17. The method of claim 14 which during steps (f) and (g) also comprises:

(1) storing the position of the cutter relative to the workpiece when during step, (f) the coolant flow to the cutter becomes equal to or less than the minimum acceptable flow rate limit;

(2) retracting the cutter away from the workpiece a predetermined distance;

(3) dwelling the cutter in the displaced position of step (2) for a predetermined period of time;

(4) monitoring coolant flow to the cutter during step (3) to determine if coolant flow to the cutter becomes greater than the minimum acceptable flow rate limit;

(5) recalling the position of the cutter stored in step (1) and rapidly advancing the cutter relative to the workpiece toward the workpiece to a position almost to the stored position if coolant flow becomes greater than the minimum acceptable flow limit during step (3); and (6) retracting the cutter completely free of the workpiece if coolant flow to the cutter remains equal to or less than the minimum acceptable flow limit during steps (3) and (4).

18. The method of claim 14 which during step (d) also comprises monitoring coolant flow to determine if coolant flow to the cutter is equal to or greater than a maximum acceptable coolant flow rate limit and retracting the cutter completely free of the workpiece if coolant flow to the cutter is equal to or greater than the maximum acceptable coolant flow rate limit.

19. The method of claim 18 wherein during step (d) coolant flow to the cutter is monitored to determine if the flow is within a range of between the minimum acceptable flow rate limit and the maximum acceptable flow rate limit for detecting chip buildup if coolant flow to the cutter is equal to or less than the minimum acceptable flow rate limit and detecting a defective cutter if coolant flow to the cutter is equal to or greater than the maximum acceptable flow rate limit.

20. The method of claim 19 wherein after step (b) coolant flow to the cutter is monitored to determine if flow is within a range between the minimum acceptable flow rate limit and the maximum acceptable flow rate limit for detecting chip buildup if coolant flow to the cutter is equal to or less than the minimum limit and detecting a defective cutter if coolant flow to the cutter is equal to or greater than the maximum limit.

21. A method of detecting chip buildup on a cutter that is movable relative to a workpiece and having a coolant passage and orifice for enabling coolant to be provided to the cutter comprising:

(a) providing a drive for moving the cutter relative to the workpiece, a coolant supply for supplying coolant to the cutter, a transducer for sensing coolant flow to the cutter, and a monitor in communication with the drive and flow transducer for monitoring coolant flow to determine if coolant flow is between a normal coolant flow window of greater than a minimum acceptable coolant flow rate limit and less than a maximum acceptable coolant flow rate limit;

(b) supplying coolant to the coolant passage and orifice of the cutter;

(c) relatively advancing the cutter toward the workpiece;

(d) relatively feeding the cutter into the workpiece to machine the workpiece;

(e) monitoring coolant flow to the cutter to determine whether coolant flow is within the normal coolant flow window;

(f) relatively moving the cutter away from its position of engagement with the workpiece a predetermined distance if coolant flow to the cutter is greater or less than the normal coolant flow window;

(g) monitoring coolant flow to the cutter after step (f) during a predetermined dwell period of time to determine if coolant flow returns to within the normal coolant flow window;

(h) repeating steps (d), (e), (f) and (g) if during step (g) coolant flow returns to within the normal coolant flow range, otherwise, relatively retracting the cutter free of the workpiece if coolant flow remains greater or less than the normal coolant flow window; and (i) relatively retracting the cutter free of the workpiece if the cutter has finished machining the workpiece.

22. An apparatus comprising, a supply for providing a continuous flow of coolant to a cutter while machining a workpiece, a drive for relatively moving the cutter toward and away from the workpiece, a transducer for sensing coolant flow to the cutter, a monitor in communication with the transducer for monitoring the coolant flow to the cutter and generating an electric signal if the coolant flow is less than a minimum acceptable coolant flow rate limit indicating chip buildup on the cutter while machining the workpiece, a controller operably connected with the drive for controlling the direction that the drive moves the cutter relative to the workpiece for causing the drive to feed the cutter into the workpiece to machine the workpiece, and the controller being responsive to the electric signal generated by the flow monitor to move the cutter away from the workpiece to remove chip buildup on the cutter during machining of the workpiece when the monitor generates the signal indicating the coolant flow is less than the minimum acceptable coolant flow rate limit.

23. The apparatus of claim 22 wherein said controller also relatively moves the cutter away from the workpiece during machining of the workpiece if the coolant flow rate is greater than a maximum acceptable coolant flow rate limit above which it is known the cutter is defective, and the controller does not interrupt machining of the workpiece in response to the flow monitor if while machining the workpiece the coolant flow rate is between said maximum acceptable coolant flow rate and said minimum acceptable coolant flow rate.

* * * * *